United States Patent [19]

Bailey

[11] Patent Number: 4,926,714
[45] Date of Patent: May 22, 1990

[54] GEAR SELECTOR FOR BICYCLE HUB TRANSMISSION

[75] Inventor: Louis Bailey, Donniz Dr., Rte. 5, Box 60A, Slidell, La. 70460

[73] Assignee: Louis Bailey, Slidell, La.

[21] Appl. No.: 247,790

[22] Filed: Sep. 21, 1988

[51] Int. Cl.$^5$ ............................................. F16H 3/66
[52] U.S. Cl. .................................... 74/337.5; 192/6 A
[58] Field of Search ................. 74/750 B, 781 B, 810, 74/812, 337.5, 57; 192/6 A

[56] References Cited

U.S. PATENT DOCUMENTS

| | | | |
|---|---|---|---|
| 510,502 | 12/1893 | Erb | 474/74 |
| 1,275,505 | 8/1918 | Veyret | 74/812 |
| 1,773,490 | 8/1930 | Larsen . | |
| 2,045,835 | 6/1936 | Coen | 74/337 |
| 2,049,103 | 7/1936 | Baumgartner | 74/363 |
| 2,159,694 | 5/1939 | Gorham | 74/333 |
| 2,519,117 | 8/1950 | Curtis | 192/139 |
| 2,590,232 | 3/1952 | Chilton | 74/336 |
| 2,690,083 | 9/1954 | Iseman | 74/217 |
| 3,015,116 | 1/1962 | Pethybridge et al. | 10/138 |
| 3,080,765 | 3/1963 | Eisele | 74/57 |
| 3,081,641 | 3/1963 | Iseman | 74/217 |
| 3,351,165 | 11/1967 | Shimano | 192/6 |
| 3,581,853 | 6/1971 | Hoff | 192/4 |
| 3,696,686 | 10/1972 | Steele | 74/337.5 |
| 3,726,156 | 4/1973 | Tijen et al. | 74/750 |
| 3,812,735 | 5/1974 | Von Kaler | 74/371 |
| 3,889,547 | 6/1975 | Sun et al. | 74/336 |
| 4,283,969 | 8/1981 | Lapeyre | 74/750 B X |
| 4,305,312 | 12/1981 | Lapeyre | 74/750 B |
| 4,376,394 | 3/1983 | Lapeyre | 74/750 |
| 4,419,905 | 12/1983 | Lapeyre | 74/337.5 X |
| 4,635,506 | 1/1987 | Imaizumi et al. | 74/745 |
| 4,713,979 | 12/1987 | Muto et al. | 74/337.5 |
| 4,721,013 | 1/1988 | Steuer et al. | 74/750 |
| 4,730,506 | 3/1988 | Kageyama | 74/337.5 |
| 4,754,662 | 7/1988 | Misawa | 74/337.5 X |

FOREIGN PATENT DOCUMENTS

814072 6/1937 France .

Primary Examiner—Dwight G. Diehl
Attorney, Agent, or Firm—David A. Rose; Ned L. Conley; Donald J. Verplancken

[57] ABSTRACT

A bicycle transmission has drive pedals connected through a pedal shaft disposed in a pedal shaft hub on a bicycle frame. The shaft is selectively engageable with a series of gear pawls which are positioned to selectively engage one of a series of gears disposed about the pedal shaft. The gears are selectively engaged with an output sprocket meshed to a rear wheel sprocket. The pedal shaft includes a series of angled slots therein, in which a cam follower pin is disposed. The cam follower includes an actuator arm to cause one of the gears to engage the pedal shaft. The slots are sized so that reverse pedal rotation will cause the cam follower to axially actuate about the pedal shaft to cause disengagement and engagment of the gears.

31 Claims, 4 Drawing Sheets

GEAR SELECTOR FOR BICYCLE HUB TRANSMISSION

BACKGROUND OF THE INVENTION

This invention relates to the field of transmissions, more particularly to multi-speed bicycle transmissions, and more particularly to multi-speed bicycle transmissions which are located at the pedal hub and are drive pedal actuated.

Bicycle transmissions are well known in the art, and are used to change the bicycle speed ratio, i.e., the ratio between the number of revolutions of the bicycle pedal crank and the number of revolutions of the bicycle tires in response to the pedal crank rotation. Although numerous types of transmissions have been tried or suggested, most transmissions are of three, five, ten, twelve or fifteen speed varieties. In a three-speed transmission, there are three speed ratios, in a five-speed transmission, five speed ratios, etc.

In a typical bicycle, the bicycle rider pedals a crank rotatably mounted on a crank shaft in a crank hub, and a sprocket, geared or bolted to the pedal crank shaft, rotates in response to pedalling. The sprocket is in turn linked to a drive chain which is also linked to a sprocket on the rear wheel. By pedalling the bicycle, the rider causes rotational movement of the pedal sprocket, which in turn rotates the rear wheel sprocket and rear wheel through a linked chain. Both the rear wheel and the pedal hub may contain the transmission elements required to effect different ratios of rear wheel to pedal hub rotation.

One commonly employed bicycle transmission is the derailleur-type transmission. In this configuration, the rear wheel hub, and in some cases the pedal hub, have a series of different diameter sprockets on a common axis. A bicycle chain is meshed with one of the gears on the rear wheel hub and one of the gears on the pedal hub. A chain finger moves the bicycle chain from one sprocket to another sprocket to effect gear ratio changes by changing the combination of gears in mesh through the chain. In a ten-speed bicycle, the rear wheel will typically have five driven sprockets and the pedal hub will have two drive sprockets.

The major disadvantage of the derailleur system is that the working components are exposed to abusive road conditions. If the derailleur or sprockets become bent or misaligned, the derailleur will no longer move the chain over the full row of gear sprockets. Further, mud or other debris can pack the gear train, causing limited derailleur movement and loss of full speed range capability. Also, because the derailleur is controlled by a cable, the rider must actuate levers to cause derailleur movement. Commonly, the cable may slip, or the lever, cable and derailleur may become misaligned, thereby causing the derailleur to lose full speed range actuation.

Several transmissions have been marketed or described in which the transmission components are located on the crank pedal hub U.S. Pat. No. 3,812,735 discloses a transmission which employs a shaft slidable pawl actuator to engage a selected one of a series of shaft mounted gears through gear pawls located on their inner diameters. In this patent, the pawl actuator is actuated by a lever located adjacent a sliding rotating sleeve on the shaft. The sleeve contains a circumferential slot and a pin on the lever is located within the sleeve. The lever is hinged to permit the pin to be moved along the longitudinal axis of the shaft, thereby moving the sleeve and attached pawl along the shaft. The actuator arm is thus locatable beneath one of the gears to cause a pawl to engage the gear.

U.S. Pat. Nos. 4,419,905; 4,283,969; and 4,305,312 to Lapeyre, disclose a pedal crank mounted transmission in which reverse pedal rotation actuates transmission speed ratio shifts. These patents disclose a multi-speed pedal hub-mounted transmission in which the output range is selected by the axial actuation of a pawl actuator along the inner diameter of a series of different diameter range gears mounted on the pedal shaft. The pawl actuator actuates a locking dog, or pawl, at the inner circumference of the gear to selectively engage the gear into locked rotation with the shaft. The pawl actuator is located in a slot in the pedal shaft, and is actuated by a sleeve located on the pedal shaft.

To effect pawl actuator movement, the sleeve includes a pair of diagonal opposed splines projecting therefrom with one side tapered and the other normal with respect to the circumferential surface of the sleeve. A spring-loaded shift control member with a pair of spaced cylindrical projections thereon is disposed about the circumference of the sleeve. The projections are axially spaced approximately equal the axial component of the diagonal sleeve splines and disposed to ride on the circumferential surface of the sleeve. When the bicycle pedal is cranked in a forward direction, the cylindrical projections slide over the tapered portion of the splines. However, if pedal motion is reversed, the normal surface of the sleeve spline engages the projection, and the axial component of the sleeve spline and the attached sleeve slide along the shaft. The pawl actuator is permanently attached to the sleeve, and the axial movement thereof causes an arm on the pawl actuator to disengage from a pawl adjacent the inner diameter of one drive ratio gear and engage a pawl adjacent the second drive ratio gear. Likewise, further shifts to higher gears, or shifts to lower gears, may be accomplished by movement of the pawl actuator arm.

The drive ratio gears are located on the pedal shaft and are meshed with an equal number of complementary spur speed change gears. Each drive ratio gear is meshed with one spur gear. The three spur gears are splined together, so that rotation of one causes rotation of all three. The drive ratio gears are free to rotate about the pedal shaft unless engaged by a locking dog or pawl. The first drive ratio gear is directly coupled to an output sprocket, which is meshed to a rear wheel sprocket or sprockets by a drive chain.

To cause gear shifts, the bicyclist simply reverses pedal rotation to cause the sleeve and attached pawl actuator to move axially on the pedal shaft, thereby causing one locking dog, or pawl, to disengage the initially engaged gear and a second locking dog, or pawl, to engage the subsequent gear. This causes the output gear ratio to change via the change in drive gears, through the spur gears, and back through first drive gear, which is keyed to the output sprocket. Although the Lapeyre device as disclosed in these patents teaches a reverse pedal rotation actuated transmission, the disclosed device is difficult to assemble and maintain.

U.S. Pat. No. 4,376,394 to Lapeyre, discloses another type of shifting system for use with the pawled drive and idler gear arrangement. In this system, the sleeve contains two concentric rings which form a groove in the sleeve about its outer circumference. A cable actuated lever is disposed in the seat post frame tube in alignment into the pedal crank hub, and the lever slides the sleeve and accompanying pawl actuator along the pedal crank shaft to cause gear shifts. The major disadvantage of this device is that it uses a cable which is connected to a shift lever located on the bicycle. The rider must commonly look away from the road to shift the transmission, and the cable may become disengaged or loose, causing erratic shifting. Further, the location of the cable-actuated lever about the pedal crank is critical, and even minor deviations in location can cause shifting to be erratic or impossible. Finally, if the bicycle owner decides to remove the transmission, a hole remains in the housing which will permit the entry of foreign material.

It is also known to employ reverse pedal rotation using a plastic sleeve mounted on the pedal shaft for axial sliding thereon. The sleeve contains opposed diagonal slots therein, and each slot has a wall which is normal to the axis of rotation and a second wall which is sloped. A pawl actuator is disposed in the sleeve for axial engagement of pawls on the inner diameter of the range drive gears. A spring-loaded pin is disposed through the wall of the pedal crank housing. As the pedal is cranked in the forward direction, the pin enters the diagonal groove at one end and slides over the sloped wall. As the pedal is turned in a counterclockwise direction, the pin engages the normal wall of the groove, which causes the sleeve to slide axially on the shaft. This movement causes the pawl to disengage one range drive gear and engage a different range drive gear. The diagonal slots on the opposed side of the sleeve, i.e., disposed thereon by 180°, move the sleeve in an axially-opposed direction.

The major disadvantage of this design is that the pin must be mounted on the exterior of the pedal housing to a close tolerance to guarantee alignment of the pin with the pedal shaft and slots. This is commonly a difficult problem, because different thicknesses of bearing cup flanges located in the crank hub will cause the pedal shaft and slots to align differently with the pin, which could render the shifting mechanism inoperable. This prevents the application of this transmission by a bicycle owner to an existing bicycle, because an expensive jig or pattern must be employed to ensure proper placement of the pin. Also, the pin is subject to environmental wear and tear, lending itself to being bent or broken which will prevent shifting of the bicycle. Further, once the pin hole is drilled, it is undesirable to revert back to the original pedal crank housing configuration because the hole will let grease out and dirt in.

SUMMARY OF THE INVENTION

The invention is an improved gear shift actuator for use with a multi-speed pedal actuated bicycle transmission where no frame modifications are required. It includes a gear actuator pawl arm attached to a sleeve piloted on guide rods mounted between the bearing cups in a bicycle pedal shaft hub. The sleeve holds a lever mounted engagement pin which rides on the bicycle pedal shaft. The pedal shaft includes a series of opposed diagonal slots therein configured to permit the pin to pass through the slots in one rotational direction and to engage the slots in the opposite rotational direction. Because the slots are diagonally disposed on the shaft, engagement of the pin therein causes the sleeve to move in an axial direction to advance the pawl arm to selectively engage and disengage the drive ratio gears.

By placing the diagonal slots on the drive shaft and the actuator sleeve in free space about the shaft, the criticality of locating the pin on the outside of the pedal hub is eliminated.

By placing the cam follower in free space about the drive shaft suspended between the bearing cups, the cam follower and actuator arm may be made one size but fit many different sizes of pedal hubs.

By placing the cam follower assembly entirely within the pedal hubs, there are no parts subject to external environmental forces.

By constructing the transmission of simple elements and parts, the transmission may be installed using only an adjustable wrench. Further, the user may adjust or change elements to change the arcuate position of the reverse pedal shift location by rotation of the cam follower support element.

By adding a pawl spacer, pawl shifting and detent may be controlled to finer accuracy and the possibility of pawl misalignment is greatly reduced.

Other objects and advantages will appear from the following description.

BRIEF DESCRIPTION OF THE DRAWINGS

For a detailed description of a preferred embodiment of the invention, reference will now be made to the accompanying drawings, wherein.

DESCRIPTION OF THE PREFERRED EMBODIMENT

Figures 1, 14:
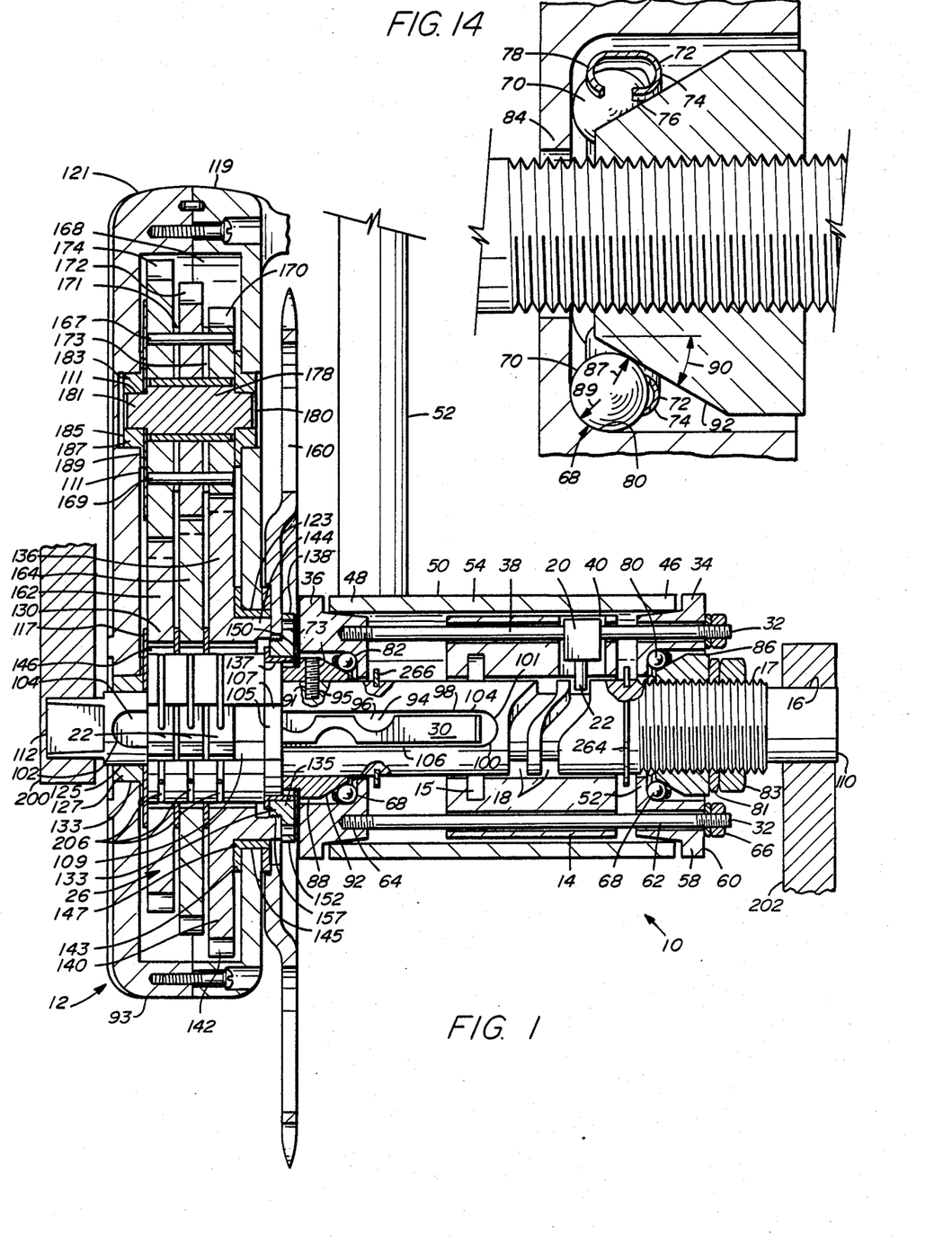
FIG. 1 is a partial cross-sectional view of the shift selector connected to a set of drive ratio gears of the present invention.
FIG. 14 is a detail of the pedal shaft bearing structure of FIG. 1.

Referring initially to FIG. 1, the gear selector 10 of the present invention is connected to a gear housing 12 with associated gears 26. The gear selector 10 includes a cam follower 14 having a cam follower actuator lever 20 located circumferentially about a pedal shaft 16. The pedal shaft 16 includes a series of grooves 18 which are constructed to selectively engage the cam follower actuator lever 20 only when pedal shaft 16 is rotated in a reverse direction, as will be described. Adjacent the inner diameter of each of the gears 26 mounted on shaft 16 are disposed internal pawls 22. The pawls 22 are locking dogs selectively actuable in a series of pawl rachets 146 located on the inner diameter of each of the gears 26. A pawl selector arm 30 is disposed within a channel in shaft 16 and has one end rotatably captivated by an internal groove 15 in the cam follower 14 and the other end disposed adjacent pawls 22 to cause a selected one of the pawls 22 to engage a pawl rachet 146 in the inner diameter 24 of one of the gears 26. During pedalling of the bicycle, cam follower 14 remains stationary in the rotational direction, and includes an inner circumferential slot 15 within which one end of pawl selector arm 30 rides. The pawl selector arm 30 rotates with, and is slidingly disposed on shaft 16, so that it may be located to selectively engage one of the gears 26. Each of the gears 26 on the pedal shaft 16 corresponds to a different ratio of pedal-to-rear-wheel rotation, and by engaging a particular gear, a particular speed ratio may be selected.

Figure 11:
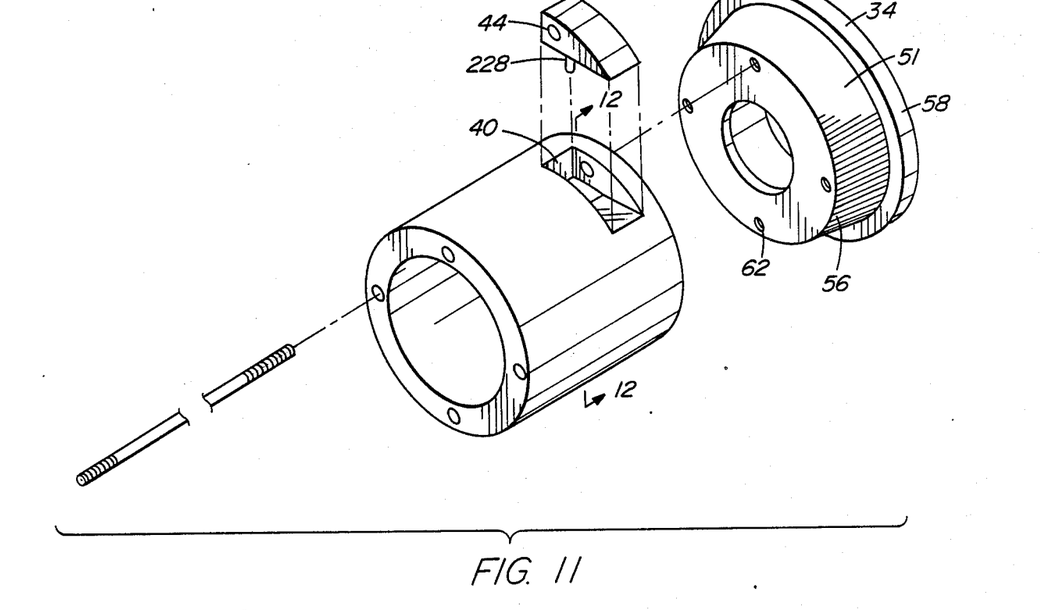
FIG. 11 is a perspective view of the cam follower assembly of FIG. 1.
Figure 12:
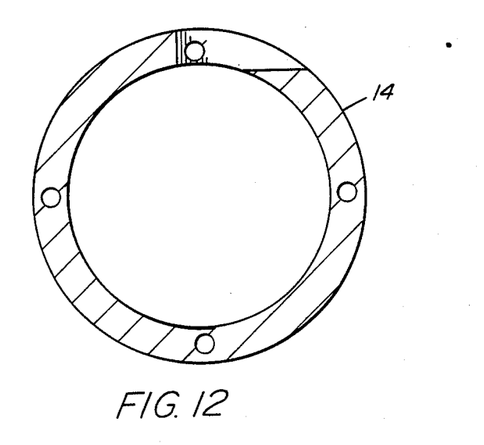
FIG. 12 is a cross-section of the cam follower of FIG. 11 at 12—12.
Figure 13:
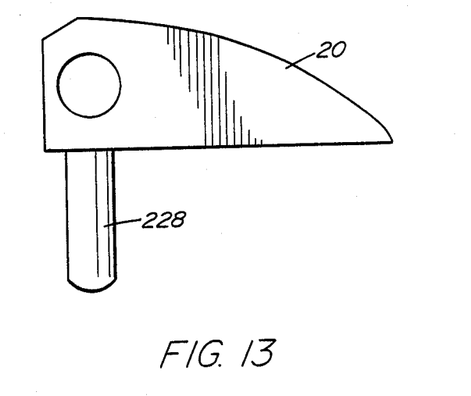
FIG. 13 is a side view of the lever and pin of FIG. 1.

Referring now to FIGS. 1 and 11, cam follower 14 is supported by guide rods 32 disposed between first and second bearing cups 34, 36. Each of the four guide rods 32 are disposed quadrangularly about and anchored upon bearing cups 34, 36, and are inserted through guide holes 38 located quadrangularly about and through cam follower 14. Cam follower 14 further includes lever slot 40 in which lever 20 is located. Lever 20 is supported in lever slot 40 by the guide rod 32 passing through lever support hole 44. Lever guide slot 40 is disposed adjacent one of guide holes 38 to permit one of guide rods 32 to pass through lever support hole 44. Lever 42 includes pin 228 located thereon which projects radially inward from cam follower 14 to ride on pedal shaft 16. Lever support hole 44 is disposed through lever 20 to balance lever 20 on guide rod 32 such that gravity will bias pin 228 against pedal shaft 16. Guide holes 38 and lever support hole 44 are sized to permit cam follower 14 to slide freely on guide rods 32.

First and second bearing cups 34, 36 are cylindrical and disposed on the opposed open ends 46, 48 of pedal shaft housing 50 to support pedal shaft 16 therein. Pedal shaft housing 50 is preferably an integral part of bicycle frame 52, and has a thin steel cylindrical wall 54. The outer diameter of bearing cups 34, 36 have a cylindrical taper 56 and a lip 58 disposed about their outer end. Cylindrical taper 56 and lip 58 permit cups 34, 36 to fit various diameter pedal shaft housings 50. The taper 56 includes serrations or ridges 51 to permit stationary anchoring of the bearing cups to the housing 50. Housings 50 of larger diameter will engage cylindrical taper 56 closer to outer face 60 than will smaller diameter housings 50. Bearing cups 34, 36 are retained in pedal shaft housing 50 by guide rods 32. One end of each guide rod 32 is anchored into an anchor hole 64 in bearing cup 36, and the opposite end is passed through retainer hole 62 in bearing cup 34 and held in place by a guide rod nut 66. Thus, cam follower 14 is disposed on guide rods 32 around pedal shaft 16 within pedal shaft housing 50 between bearing cups 34, 36.

Referring now to FIGS. 1 and 14, each bearing cup 34, 36 further includes a bearing 68 disposed on its inner diameter. The bearings are preferably ball bearings, and are sized to support the pedal shaft 16 in rotational alignment with cam follower 14. Bearing 68 is comprised of a series of balls 70, preferably ten, held in a retainer 72. However, various sizes and numbers of balls, or other variations on the bearing, may be employed without deviating from the scope of the invention. Retainer 72 is a continuous circular piece of steel stock, conformed to the contour of the balls 70. The retainer 72 has an arcuate rear surface 74 and a pair of fingers (not shown) disposed between each ball to retain each ball 70 but permit free spherical rotation thereof. Therefore, the balls are free to contact bearing race surfaces along their inner and outer diameters and one side of the retainer. Although a retained bearing is preferred, free ball bearings could be employed. Bearings 68 are located in race 80 on the inner diameter of bearing cup 34 and race 82 located on the inner diameter of bearing cup 36. Races 80, 82 are arcuate and match the contour of balls 70. Races 80, 82 contour into retainer lip 84 which terminates at the inner diameter of bearing cups 34, 36.

Pedal shaft 16 is supported in pedal shaft housing 50 by tapered bearing cones 86, 88 located thereon in rotational engagement with bearings 68. As best shown in FIG. 1, cone 86 is located on pedal shaft 16, and engages bearing 68 along the inner diameter thereof. Likewise, bearing 68 bears on race 80 of bearing cup 34. Although bearing 68 is radially-disposed between pedal shaft 16 and bearing cup 34, the engagement of the bearing 68 does not occur at the absolute inner and outer diameter thereof, but at inner and outer bearing thrust locations 87, 89. Thrust locations 87, 89 are disposed diametrically across ball 70, and are offset from the normal radial direction by the taper angle 90 of tapered bearing cone 86. Therefore, bearing 72 will support both radial and axial loads. Tapered bearing cones 86, 88 are located on the pedal shaft 16 such that taper faces 92 are disposed toward the middle of the shaft 16. Bearing cone 88 is attached to shaft 16 by a set screw 91 inserted through screw slot 93 in cone 88 and into blind hole 95 in shaft 16. Cone 86 is threadably engaged on threads 17 on shaft 16, and held in place by lock washer 81 and lock nut 83 which are tightened against bearing cone 86 upon assembly of gear selector 10 to frame 52. Upon assembly of bearings 68 and cones 86, 88, pedal shaft 16 is held in rotational alignment with the centerline of cam follower 14, which is held in alignment with pedal shaft 16 by rods 32 disposed through bearing cups 34, 36. Thus, the pedal shaft 16 and cam follower 14 with lever 42 are self-aligning, eliminating the need for an expensive pattern or jig to install the transmission.

Figure 9:
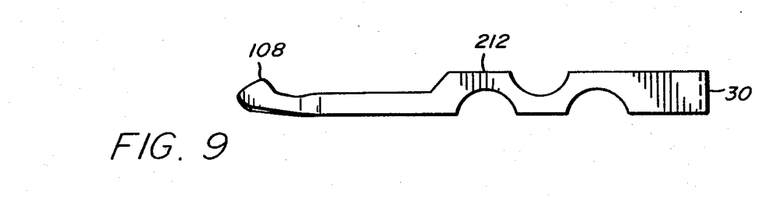
FIG. 9 is a top view of the pawl selector finger of FIG. 1.
Figure 10:
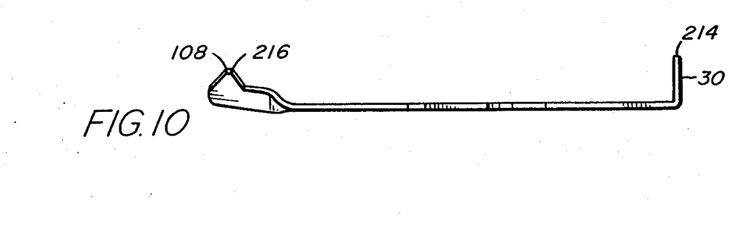
FIG. 10 is a side view of the pawl selector finger of FIG. 9.

Referring now to FIGS. 1, 2, 9 and 10, pedal shaft 16 further includes a pawl selector channel 94 disposed axially therein between cam follower 14 and pawls 22 and is sized to permit pawl selector arm 30 to slide therein. Pawl selector channel 94 is preferably machined into pedal shaft 16, and has a flat base 96 and perimeter wall 98. Perimeter wall 98 has rounded ends 100, 102 and flat sides 104, 106. As shown in FIGS. 9 and 10, pawl selector arm 30 includes a flat selector base 212 having cam follower finger 214 projecting perpendicularly therefrom at one end and pawl selector finger 108 at its other end. Pawl selector finger 108 is a triangular section cut from base 212 and bent at an approximate 45° angle such that the triangular tip 216 of the cutout extends slightly above perimeter wall 98.

As best shown in FIG. 1, pedal shaft 16 is held in pedal shaft housing 50 such that shaft ends 110, 112 protrude outwardly therefrom. Ends 110, 112 may employ a cottered or cotterless configuration to secure a pedal crank arms 200, 202 and pedal thereto to induce rotational motion to the pedal shaft 16. Such pedal attachment configurations are well known in the art. As already described, pedal shaft 16 is stationarily mounted in pedal shaft housing 50 by bearings 68.

Figures 8, 15:
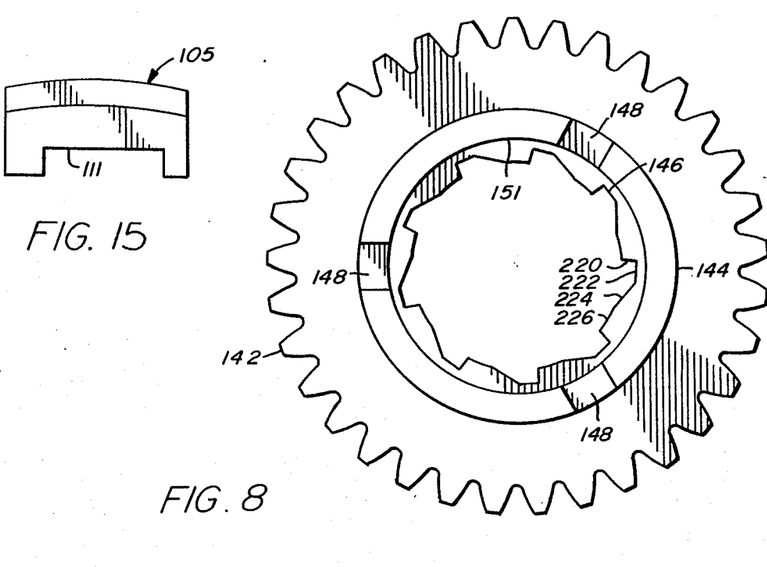
FIG. 8 is a side view of a drive gear of FIG. 1.
FIG. 15 is an end view of the pawl journal spacer of FIG. 2.

Gear selector section 120 is located on pedal shaft 16 within gear housing 12 between bearing cone 88 and shaft end 112, and is comprised of an axially continuous journal 122 having an axial pawl slot 124 disposed therein colinearly adjacent pawl selector channel 94. Journal 122 is preferably a continuous enlarged diametrical section machined on pedal shaft 16 having pawl slot 124 machined therethrough. Journal 122 is preferably case hardened around its outer circumference. A pawl journal spacer 105 is disposed in pawl slot 124 to form a continuous journal. As best shown in FIGS. 1 and 15, pawl journal spacer 105 has a first arcuate portion aligned with the outer diameter of secondary journal 132 and second arcuate portion aligned with the outer diameter of journal 122. Pawl journal spacer 105 forms one continuous bearing journal for first gear 136 and sprocket 160 and forms a support adjacent pawls 22 to help maintain pawls 22 in alignment in selector channel 94. A journal spacer cutout 111 is included to permit pawl arm 30 to slide under spacer 105 without interference.

Adjacent journal 122 on shaft 16 is located secondary journal 132 which has a smaller diameter than journal 122. Secondary journal 132 is preferably a continuous section of pedal shaft 16 machined into a cylinder adjacent journal 122 and case hardened. Secondary journal 132 supports output sprocket 160 on first gear bearing 138. First gear bearing 138 is preferably a two-piece bronze sleeve bearing, located on the inner diameter of first gear 136, having a threaded outer bearing 135 received in threads 151 on first gear 136, and an inner bearing 137 press fit therein. Adjacent journal 122 and end 112 is third journal 133. Third journal 133 is disposed in side 121 of gear housing 12 to support pedal shaft 16 as will be described.

As best shown in FIGS. 1 and 8, first gear 136 is comprised of a web 140 supporting gear teeth 142 disposed about an axially projecting transfer hub 144. The inner diameter of web 140 contains pawl rachets 146 for selective engagement with pawls 22 disposed about journal 122. Pawl rachets 146 are located about the inner diameter of each drive gear 26, and are of a common construction. Transfer hub 144 is disposed colinear with web 140 and contains keys 148 disposed on its end 150, and has a threaded inner diameter 151. Although three keys are used in the preferred embodiment, an alternate number of keys may be employed without deviating from the scope of the invention. First gear bearing 138 is threaded into the inner diameter 151 of transfer hub 144. First gear bearing 138 has radial lip 152 located on its outer circumference, which abuts transfer hub end 150 disposed on transfer hub 144 opposite web 140.

Output sprocket 160 is keyed to transfer hub 140 at keys 148. Pedal motion from pedal shaft 16 is transferred through first gear 136 and into sprocket 160. Sprocket 160 is meshed with a rear wheel sprocket through a chain to drive the bicycle rear wheel in response to forward pedal motion. Sprocket 160 is retained on transfer hub 144 by radial lip 152 of bearing 138.

Gears 26 further include second drive gear 162 and third drive gear 164 journaled directly on journal 122, and have pawl rachets 146 for selective engagement with pawls 22. First, second, and third drive gears 136, 162, and 164 are maintained in constant mesh with countershaft gears 168. Countershaft gears 168 include first countershaft gear 170 in mesh with first drive gear 136, second countershaft gear 172 in mesh with second drive gear 162, and third countershaft gear 174 in mesh with third gear drive 164. Countershaft gears are colinearly journaled to countershaft 178, which is mounted in opposed countershaft journals 180, 181 located in opposed sides 119, 121. Second countershaft gear 172 has bosses 171, 173, disposed on each side of the gear to maintain each countershaft gear 168 in alignment with each drive gear 26. Countershaft journals 180, 181 each include a countershaft bore 183 in which an alignment bearing 185 is press fit. Alignment bearing 185 has a sleeve section 187 for supporting shaft 178 in rotational alignment, and alignment lip 189 disposed radially about sleeve 187 to maintain countershaft gears 168 in alignment in sides 119, 121. Thrust bearing 111 is disposed between alignment lip 189 and third countershaft gear 174. Journal 178 has an annular lip 189 which pilots into alignment bearing 185. Countershaft gears 168 are locked together by pins 167, 169, so that rotation of any one of the countershaft gears 168 causes all countershaft gears 168 to rotate at the same speed in the same direction.

Side 119 includes first gear pilot 123, and side 121 includes second gear pilot 125, disposed in colinear alignment to receive and support pedal shaft 16. Sides 119 and 121 form gear housing 93. Gear housing 93 is preferably held together by screws, but other attachment means could be employed to attach sides 119, 121. Pilot 125 includes sleeve and thrust bearing 127 disposed circumferentially about third journal 133 to support pedal shaft 16 in side 121 and locate pedal shaft 16 in proper alignment with gears 26. Side 121 includes annular thrust bearing 117 disposed in colinear alignment with pilot 125 for receiving end 112 therethrough and supporting axial loads transmitted through sleeve and thrust bearing 127. Pedal shaft 16 is maintained in side 119 through gear sleeve bearing 143. Gear sleeve bearing 143 is an annular ring having a right angle cross-section forming a thrust bearing lip 145 and annular section 147 press fit into pilot 123. The inner diameter of bearing 143 forms a sleeve bearing which rides on the outer diameter of transfer hub 144.

The use of three drive gears and three countershaft gears 168 permits three transmission speeds. In first gear or speed, torque is created at the ends, 110, 112 of pedal shaft 16 by rotation of crank arms (not shown) by the forward pedalling motion of the rider's feet and legs. This torque causes the pedal shaft 16 to rotate. With pawl selector arm 30 positioned to place triangular tip 216 adjacent the inner diameter of first gear web 140, one of pawls 22 selectively engages first gear 136 in one of pawl rachets 146, causing first gear 136 to rotate in the same speed and direction as pedal shaft 16. Front wheel sprocket 160 is keyed directly to first drive gear 160, and therefore rotates at the same speed and direction as pedal shaft 16 in first gear.

To change gears, one of pawls 22 selectively disengages first gear 136 and engages second drive gear 162, as will be described further. Only one drive gear 26 is engaged to drive shaft 16 at a time, so that the remaining drive gears 26 freewheel around journal 122. In second gear, second drive gear 162 is pawled to pedal shaft 16 and rotates at pedal shaft speed. Second drive gear rotation 162 causes second countershaft gear 172 to rotate in an opposite direction at second gear ratio speed relative to pedal shaft 16 speed. First countershaft gear 160 is splined to second countershaft gear 162 and rotates in the same speed and direction. First drive gear 136 and drive sprocket 160 are driven by first countershaft gear 170. A third gear and speed ratio may likewise be selected by engaging pawl 22 with third drive gear 164. Because the drive gears 26 are different sizes, and the corresponding countershaft gears 168 drive sprocket 160 back through first drive gear 146 at second and third speed ranges, a series of three different speed ranges are created.

Figures 2, 3, 4, 5:
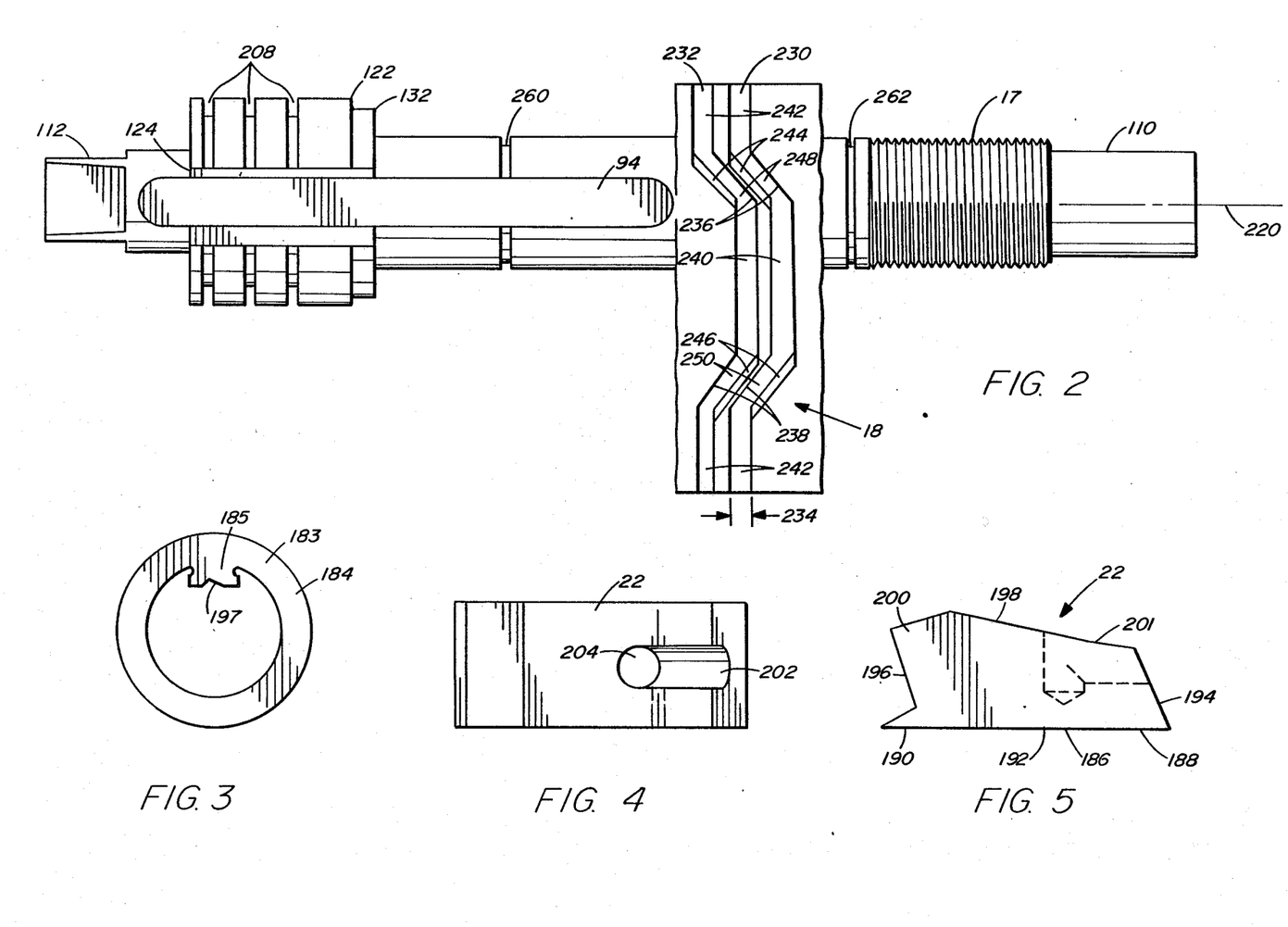
FIG. 2 is a side view of the shaft with the grooves shown in unfolded plan view.
FIG. 3 is a side view of a pawl spacer of FIG. 1.
FIG. 4 is a top view of the pawl of FIG. 3.
FIG. 5 is a side view of the pawl of FIG. 3.

To effect gear changes, pawl selector arm 30 is axially actuated in pawl selector channel 94 to cause one of pawls 22 to disengage the pawl rachets 146 on one of gears 26 and engage the pawl rachets 146 on another of the gears 26. One pawl 22 is disposed in pawl selector channel 94 in radial alignment with each one of drive gears 26. Pawls 22 are maintained in alignment with gears 26 by gear washers 184 as shown in FIG. 3. Each gear washer 184 has a radial section 183 and a pawl separator finger 185. Radial section 183 serves as a thrust washer to separate each of gears 26. Separator finger 185 projects into pawl slot 124 between each pawl 22. Separator finger 185 has pawl arm clearance cutout 197 therein, which permits triangular tip 216 to pass under finger 185 and access pawls 22.

As best shown in FIGS. 1, 5, 6, and 7, each pawl 22 has a flat base 186 sized to span the width of pawl slot 124, comprised of a fulcrum base 188 and a support finger 190 spanned by an engagement flat 192. Extending from flat base adjacent fulcrum base 188 is fulcrum limit wall 194, which extends at an acute angle therefrom. Adjacent support finger 190 and parallel to fulcrum limit wall 194 is pawl engagement face 196. Between pawl engagement face 196 and fulcrum limit wall 194 is pawl top 198, comprised of forward top wall 200 intersecting pawl engagement face 196 at nearly a right angle, and rear top wall 201 extending therefrom at an obtuse angle.

Rear top wall 201 has snap ring channel 202 disposed along its center, terminating in snap ring anchor hole 204. To maintain pawls 26 in pawl slot 124, snap rings 206 made of spring steel wire are disposed in snap ring grooves 208 disposed about the circumference of journal 122. Snap ring grooves are sized to permit snap ring 206 to ride therein without projecting about the surface of journal 122. Snap ring grooves 208 are disposed along the centerline of the intended gear 26 locations. Thus, one groove is located along the circumferential centerline of first gear web 140, second gear 162, and third gear 164. Snap ring 206 is a nearly circumferential arc of spring steel, having snap ring finger comprised of a radially inward bend of spring steel disposed at one end of the wire. Finger (not shown) is disposed in anchor hole 204, thereby retaining pawl 26 in place in pawl slot 124 and biasing pawl 22 to bridge the pawl slot. Pawl slot 124 is slightly wider than pawl selector channel, forming bridge ledge 123 and fulcrum ledge 125.

Figure 6:
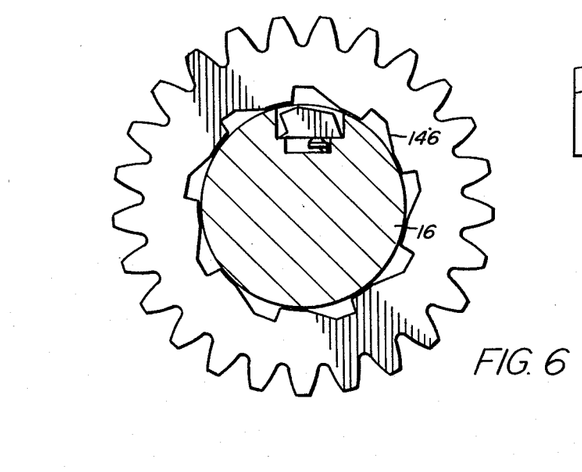
FIG. 6 is an end view of the pedal shaft of FIG. 1 showing a pawl in the disengaged position.
Figure 7:
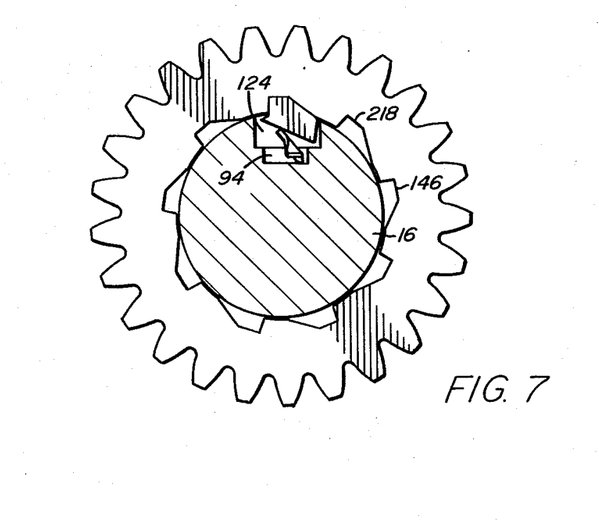
FIG. 7 is an end view of the pedal shaft of FIG. 1 showing a pawl in the engaged position.

As best shown in FIGS. 6, 7 and 8, each of gears 26 has pawl rachets 146 comprised of a series of pawl engagement cutouts 218 located about its inner circumference. Each cutout 218 has a radial wall 220 disposed substantially parallel to radii extending from the center of gear 26, an outer wall 222 disposed normal thereto, and a blend wall 224 which blends into the inner diameter 226 of the gear 26. To engage a gear 26, the pawl finger 108 engages pawl base 186 with triangular tip 216, causing pawl 26 to move in an arc around the intersection of fulcrum base 188 and fulcrum limit wall 194. Snap ring maintains fulcrum base 188 in contact with fulcrum ledge, so that support finger 190 moves away from bridge ledge. This movement causes pawl engagement face 196 to project up into pawl engagement cutout to engage radial wall 220. Finger 190 presses against inner diameter 226, which prevents pawl 26 overtravel which could cause pawl 26 to come out of slot 124. As pawl finger slides out from under pawl 26, snap ring 206 forces pawl 26 out of engagement with gear 26 and back into pawl slot 124.

As best shown in FIGS. 1 and 2, to effectuate movement of pawl selector finger 108, pedal shaft 16 includes two pairs of opposed actuator grooves 18 therein. Cam actuator lever 20 is disposed in cam follower 14 and engages actuator grooves during reverse pedal rotation. Actuator grooves 18 are located in pedal shaft 16 and have diametrically-opposed sections angularly disposed approximately 60 degrees from the centerline 220 of pedal shaft 16.

Actuator grooves 18 are comprised of first actuator groove 230 and second actuator groove 232. Each of grooves 230 and 232 is a continuous groove preferably machined into the surface of pedal shaft 16. Grooves 230 and 232 have base width 234. Cam follower actuator lever 20 has cylindrical pin 228 attached thereto and in contact with the outer diameter of pedal shaft 16 adjacent actuator grooves 18. Base width 234 is slightly greater than the diameter of cylindrical pin 228. Pin 228 is biased to exert a force downward into grooves 18. Each of grooves 230 and 232 include forward actuator wall 236 and reverse actuator wall 238, on axially and diametrically-opposed sides of the groove separated by pin alignment sections 240, 242. Across from each actuator wall 236, 238 in grooves 230, 232 is a sloped wall 244, 246. Each pair of actuator walls 236, 238 and sloped walls 238, 240 form shift grooves 248, 250. Shift grooves 248, 250 are disposed at an acute angle to the centerline of the pedal shaft 16, and each deviates at an equal and opposite angle thereto. Located between shift grooves 248, 250 are pin alignment sections 240, 242. Shift grooves 248, 250 and pin alignment sections 240, 242 form one continuous groove 18.

Although the use of sloped walls 238, 240 has been described, it should be appreciated that the gear selector will operate if sloped walls are replaced with flat walls. Because lever 20 is freely disposed on guide rod 38, it will engage normal or flat walls in one pedal shaft direction, but is free to pop out in the other direction even if the wall it engages is flat.

Referring to FIGS. 1, 2, and 11, pin 228 is cantilevered on guide rod 32 within cam follower 14, such that axial movement of pin 228 with respect to pedal shaft 16 causes cam follower 14 to slide axially on cam follower support rods 38. As pedal shaft 16 is rotated in a forward direction by pedalling, pin 228 is located adjacent one of grooves 18. In first gear, pin 228 will be located directly adjacent pin alignment section 240 of groove 230. As pedal shaft 16 rotates, groove 230 will rotate past the end of pin 228. Pin 228 will register into groove 230 at alignment section 240, and then ride up sloped wall 244 and onto the outer circumference of pedal shaft 16 as sloped wall 238 passes the base of the pin 228. Pin 228 will ride on this outer circumference until it re-engages groove 230 at pin alignment section 240. In this configuration, pawl selector arm 30 is disposed in pawl actuator channel such that selector finger 108 is disposed beneath first gear pawl to engage first gear to pedal shaft 16.

To cause a shift to second gear, the rider brings the left hand pedal to a 90 degree, or horizontal position, so that the pedal crank arm 200, 202 is horizontal and the pedal is at the rear portion of its cycle. The rider than pedals backwards. This rear pedalling motion causes the side of pin 228 to engage forward actuator wall 236. As forward actuator wall 236 passes pin 228, pin 228 moves axially causing cam follower 14 and pawl actuator arm 30 to likewise move axially by an equal distance. Movement of pawl actuator arm 30 causes pawl selector finger 108 to disengage from first gear pawl thereby disengaging first gear and engage second gear pawl into second gear.

To shift from second gear to third gear, the rider must again pedal in the forward direction, and then align the left hand pedal in the back horizontal position. Subsequent reverse pedalling will cause pin 228 to engage forward actuator wall 236 of groove 232, thereby causing pin 228, cam follower 14, and pawl actuator finger 108 to move axially to disengage second gear pawl and engage third gear pawl.

To actuate down shifts, the rider must place the right hand pedal in the above described back horizontal position, and then pedal in reverse direction one-quarter revolution. If, for example, the transmission is in third gear, this movement causes pin 228 to engage reverse actuator wall 238 of groove 232, thereby causing pin 228, cam follower 14, and pawl selector finger 108 to move axially the distance of the axial component of reverse actuator wall 238. This movement causes third gear pawl to disengage third gear and second gear pawl to engage second gear. Down shifts from second to first gear likewise require placement of the right pedal in the horizontal position and subsequent reverse pedal rotation. During normal forward pedal rotation, pin 228 will not engage shift grooves 248, 250 because pin 228 is free to slide over sloped wall 238 or 240 and onto the outer circumference of pedal shaft 16 during part of its rotation.

Although during normal operation the cam follower will not overtravel to permit the pin 228 to axially pass grooves 18, shaft 16 includes snap ring grooves 260, 262 located thereon. Snap rings 264, 266 are located therein, and project above snap ring grooves 260, 262 to interfere with cam follower 14 in case of axial overtravel thereof.

Although the reverse pedal actuation location and arcuate travel has been described, one skilled in the art should appreciate that simple modifications in the parts could be accomplished to cause the shift location and arcuate actuation required to cause a shift to change. For example, bearing cups 34, 36 may be rotated slightly to permit the pedal location for shifting to be changed from the horizontal. Likewise, shift grooves 248, 250 could be angularly deviated, to cause more or less reverse pedal motion to effect shifts. For example, a greater angle between the shift groove 248, 250 and the shaft centerline 220 will require greater pedal rotation to cause pawl selector finger 108 to disengage one of gears 26 and engage another. Further, by reversing the location of the grooves 18, the forward and reverse shifting pedal may be reversed, such that the right hand pedal may be used for up shifts, and the left hand pedal for down shifts.

Although a three-speed transmission has been described, other numbers of speeds may be employed by adding or subtracting gears 26 and accompanying shift grooves.

Although a preferred embodiment of my invention has been described, one skilled in the art may make modifications thereof without deviating from the scope thereof.

I claim:

1. A reverse pedal-actuated, multi-speed bicycle transmission comprising:
   a pedal shaft rotatably displaceable in a pedal shaft hub of a bicycle frame;
   said pedal shaft hub having opposed open ends;
   a plurality of drive gears rotatably disposed on said pedal shaft for selective rotational engagement therewith;
   pawl means for selectively connecting each of said drive gears into driving engagement with said shaft;
   a cam follower disposed about said pedal shaft for longitudinal displacement therealong;
   cam follower support means supporting said cam follower to prevent rotation thereof;
   cam follower engagement means engageable with said cam follower and said pedal shaft and responsive to an arc of reverse rotational displacement of said pedal shaft for displacing said cam follower longitudinally with respect to said pedal shaft; and
   a pawl arm disposed on said pedal shaft for rotation therewith and longitudinal displacement thereon in response to cam follower displacement for effecting the selective connection of each of said drive gears into rotational engagement with said pedal shaft.

2. The transmission of claim 1, wherein said cam follower support means are four guide rods disposed about the pedal shaft and through clearance holes in said cam follower.

3. The transmission of claim 2, wherein said guide rods are further supported in bearing cups disposed in the ends of said pedal shaft hub.

4. The transmission of claim 3, wherein said pedal shaft is supported by bearings disposed on said bearing cones.

5. The transmission of claim 2, wherein said cam follower engagement means includes a pin disposed on a lever located within said cam follower and projecting inward to contact said pedal shaft, said pedal shaft having a series of opposed staggered offset and diametrical grooves therein;
   said pin disposed on said shaft to selectively engage said offset grooves during reverse pedal rotation.

6. The transmission of claim 5, wherein said grooves are comprised of two continuous grooves, each of said grooves having two offset and two diametrical grooves thereon.

7. The transmission of claim 6, wherein said offset portions of each of said grooves have a wall normal to the base of the groove and a wall opposed thereto and angled at an obtuse angle from the base of the groove.

8. The transmission of claim 7, wherein said lever has a hole therethrough having a centerline disposed normal to and intersecting with the centerline of said pin, and having one of said support rods disposed therethrough.

9. The transmission of claim 8, wherein said cam follower has a right-angled section cutout disposed on its outer circumference receiving said lever.

10. The transmission of claim 9, wherein said lever has a finger disposed substantially perpendicular to said pin and received within said cutout.

11. The transmission of claim 1, wherein said cam follower is a transverse section of right circular cylinder with a central axial bore therethrough.

12. The transmission of claim 11, wherein said cam follower has a groove therein about its inner circumference for slidingly receiving a portion of said pawl arm therein.

13. The transmission of claim 12, wherein said pawl arm is a continuous section of metal strip having a pawl finger disposed at one end by forming an angular cutout thereon and bending said cutout and an acute angle thereto, and a cam follower finger at its other end formed by bending the end of said pawl arm at an approximate 90 degree angle.

14. The transmission of claim 13, wherein said cam follower finger is disposed in said groove in said cam follower.

15. The transmission of claim 14, in which said pedal shaft has a shaft groove therein in which said pawl arm is disposed for axial displacement therealong.

16. The transmission of claim 15, wherein said pawl means are a series of pawl fingers disposed along the inner diameter of each of said drive gears.

17. The transmission of claim 16, wherein said pawl fingers are disposed in a pawl slot on said shaft colinear with and transposed on said shaft groove.

18. The transmission of claim 17 wherein said pawls are separated by pawl spacers disposed on gear spacers between said drive gears to maintain said pawls in alignment with said gears.

19. The transmission of claim 18, wherein said pawls have a continuous flat base for engagement with said pawl arm.

20. The transmission of claim 1, wherein an output sprocket is disposed on a transfer hub on said first drive gear, and said sprocket is retained on said hub by a threaded lipped bearing threadingly engaged in said hub.

21. A reverse pedal-actuated, multi-speed bicycle transmission, comprising:
a bicycle frame having a pedal shaft housing having opposed open ends;
a pedal shaft received within said housing having its ends projecting therefrom;
cranking means for inducing rotational movement to said shaft;
a plurality of drive gear rotatably disposed on said pedal shaft;
gear engagement means for selectively drivingly interconnecting said shaft and said gears;
gear selector means for selecting said gear engagement means and located about said pedal shaft;
a gear selector arm disposed within said gear engagement means and said gear selector means to cause said gear engagement means to selectively engage one of said drive gears in response to the location of said gear selector means; and,
said gear selector means includes a cam follower supported about said pedal shaft by guide rods to restrict rotational movement thereof.

22. The transmission of claim 21, wherein said guide rods are supported in bearing cups disposed in the ends of said pedal shaft housing.

23. The transmission of claim 22, wherein said bearing cups have serrations therein to grip said pedal shaft hub and prevent rotation of said bearing cups therein.

24. The transmission of claim 21, wherein said gear selector means further includes a pinned lever disposed within said cam follower, and guide slots disposed in said shaft for selective receipt therein of said pin.

25. The transmission of claim 24 wherein said lever is supported in said cam follower by one of said guide rods.

26. The transmission of claim 25, wherein (x-1) guide slots are disposed on said shaft, x being the number of transmission drive gears.

27. The transmission of claim 26, wherein said slots are continuous slots disposed circumferentially around said shaft.

28. The transmission of claim 27, wherein each of said slots has two circumferential and two angularly deviated sections, each of said angularly deviated sections being disposed at equal and opposite angles to the centerline of one of said circumferential sections.

29. A bicycle transmission having a drive shaft and a plurality of selectable drive gears mounted on the shaft, the improvement therein comprising:
a rotatable axially fixed cam disposed circumferentially on the drive shaft;
a non-rotatable axially displaceable cam follower surrounding said cam to select one of the drive gears; and,
said cam is a groove disposed in a pedal shaft.

30. A bicycle transmission having a drive shaft and a plurality of selectable drive gears mounted on the shaft, the improvement therein comprising;
a rotatable axially fixed cam disposed circumferentially on the drive shaft;
a non-rotatable axially disposable cam follower surrounding said cam to select one of said drive gears; and,
said cam follower is supported on guide rods about said cam.

31. A bicycle transmission having a drive shaft and a plurality of selectable drive gears mounted on the shaft, the improvement therein comprising;
a rotatable axially fixed cam disposed circumferentially on the drive shaft;
a non-rotatable axially disposable cam follower surrounding said cam to select one of said drive gears; and,
said cam follower further includes a pawl arm.

* * * * *

UNITED STATES PATENT AND TRADEMARK OFFICE
CERTIFICATE OF CORRECTION

PATENT NO. : 4,926,714
DATED : May 22, 1990
INVENTOR(S) : Louis Bailey

It is certified that error appears in the above—identified patent and that said Letters Patent is hereby corrected as shown below:

On the cover page, Column 1, item (73) Assignee: delete "Louis Bailey, Slidell, La." and in-sert -- Alec A. Johnson, Santa Ana, California--.

Signed and Sealed this

Eighth Day of October, 1991

Attest:

HARRY F. MANBECK, JR.

Attesting Officer

Commissioner of Patents and Trademarks